United States Patent
Summerhill et al.

(10) Patent No.: US 7,067,460 B2
(45) Date of Patent: Jun. 27, 2006

(54) ORGANOFUNCTIONAL COMPOUNDS FOR SHALE STABILIZATION OF THE AQUEOUS DISPERSED PHASE OF NON-AQUEOUS BASED INVERT EMULSION DRILLING SYSTEM FLUIDS

(75) Inventors: Jerry L. Summerhill, Katy, TX (US); Michael A. Jarrett, Houston, TX (US); Alexander J. McKellar, Houston, TX (US); David B. Young, Conroe, TX (US); Patrick E. Grover, Kingwood, TX (US); William J. Gusler, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 335 days.

(21) Appl. No.: 10/294,533

(22) Filed: Nov. 14, 2002

(65) Prior Publication Data

US 2004/0097380 A1    May 20, 2004

(51) Int. Cl.
*C09K 8/36* (2006.01)

(52) U.S. Cl. .................. 507/103; 507/129; 507/131; 507/135; 507/139; 507/120; 507/128

(58) Field of Classification Search ............... 507/103, 507/129, 131, 135, 139, 120, 128
See application file for complete search history.

(56) References Cited

U.S. PATENT DOCUMENTS

| | | | |
|---|---|---|---|
| 2,761,835 A | 9/1956 | Brown | |
| 2,761,843 A | 9/1956 | Brown | |
| 2,861,042 A | 11/1958 | Watkins | |
| 3,650,951 A * | 3/1972 | Marsh et al. | 507/131 |
| 4,090,887 A * | 5/1978 | Marquisee et al. | 106/409 |
| 4,230,183 A | 10/1980 | Kalfoglou | |
| 4,508,628 A * | 4/1985 | Walker et al. | 507/129 |
| 4,521,452 A | 6/1985 | Highsmith | |
| 4,534,783 A * | 8/1985 | Beestman | 71/27 |
| 4,579,667 A | 4/1986 | Echt et al. | |
| 4,579,670 A | 4/1986 | Payne | |
| 4,579,671 A | 4/1986 | Lundberg et al. | |
| 4,974,678 A | 12/1990 | Himes et al. | |
| 5,197,544 A | 3/1993 | Himes | |
| 5,211,239 A | 5/1993 | Thomas et al. | |
| 5,403,821 A | 4/1995 | Shioji et al. | |
| H001611 H * | 11/1996 | Patel | 507/103 |
| 5,593,953 A * | 1/1997 | Malchow, Jr. | 507/135 |
| 5,605,879 A | 2/1997 | Halliday et al. | |
| 5,771,971 A | 6/1998 | Horton et al. | |
| 5,837,655 A | 11/1998 | Halliday et al. | |
| 5,851,958 A | 12/1998 | Halliday et al. | |
| 5,905,081 A | 5/1999 | Petel | |
| 5,977,031 A | 11/1999 | Patel | |
| 5,985,800 A | 11/1999 | Patel | |
| 6,227,295 B1 | 5/2001 | Mitchell et al. | |
| 6,405,809 B1 * | 6/2002 | Patel et al. | 175/50 |
| 6,609,578 B1 * | 8/2003 | Patel et al. | 175/64 |
| 6,755,915 B1 * | 6/2004 | Van Soest et al. | 127/65 |
| 2003/0158045 A1 * | 8/2003 | Jarrett | 507/100 |

* cited by examiner

*Primary Examiner*—Philip C. Tucker
(74) *Attorney, Agent, or Firm*—Paula Morris; Morris & Amatong, P.C.

(57) ABSTRACT

Invert emulsion drilling system fluids comprising an oleaginous continuous phase and a non-oleaginous dispersed phase, the dispersed phase comprising organofunctional compound(s) effective to provide shale inhibition. The organofunctional compound(s) may be used either as a supplement to or as a substitute for metallic salts.

79 Claims, No Drawings

ORGANOFUNCTIONAL COMPOUNDS FOR SHALE STABILIZATION OF THE AQUEOUS DISPERSED PHASE OF NON-AQUEOUS BASED INVERT EMULSION DRILLING SYSTEM FLUIDS

FIELD OF THE INVENTION

The invention relates to invert emulsion drilling system fluids. More particularly, the invention relates to invert emulsion drilling system fluids comprising an oleaginous continuous phase and a non-oleaginous dispersed phase, the dispersed phase comprising organofunctional compound(s) effective to provide shale inhibition. The organofunctional compound(s) may be used either as a supplement to or as a substitute for metallic salts.

BACKGROUND OF THE INVENTION

Drilling system fluids comprising water as the continuous phase often are ecologically favored over fluids in which oil is the continuous phase. Unfortunately, the walls of a wellbore frequently are composed, at least in part, of shale. When exposed to water, many shales swell, slough, or spall to the extent that they prevent further operation of the wellbore. Shale also may slough during gravel transport in open-hole completion, mix with the gravel, and/or reduce the productivity of the well by choking off the permeability of the gravel pack. Shale sloughing also may cause screen blinding.

The use of invert emulsion drilling system fluids may help to minimize shale hydration. An invert emulsion fluid comprises "oil" as the continuous phase and an emulsified aqueous dispersed phase. In order to minimize hydration of shale, the aqueous dispersed phase typically comprises a brine comprising metallic salts at a salinity greater than the salinity of the interstitial water in the shale.

Unfortunately, contamination by highly reactive drilled solids may cause rheological and/or filtration control problems and also may decrease emulsion stability in invert emulsion drilling system fluids. Alternative invert emulsion drilling system fluids are needed.

SUMMARY

An invert emulsion drilling system fluid with effective rheology and fluid loss control properties, said drilling system fluid comprising an oleaginous continuous phase and a non-oleaginous dispersed phase, said dispersed phase comprising an amount of at least one organofunctional compound effective to provide shale inhibition.

DETAILED DESCRIPTION

The present application provides invert emulsion drilling system fluids which are effective to minimize shale hydration by the dispersed phase while maintaining effective rheology, filtration control, and emulsion stability in the presence of contamination by reactive drilled solids. The invert emulsion drilling system fluids avoid the need to use high concentrations of metallic salts in order to achieve shale stabilization.

The invert emulsion drilling system fluids comprise a continuous phase comprising an "oleaginous" liquid and a dispersed phase comprising a "non-oleaginous" liquid. As used herein, the term "oleaginous liquid" means an oil which is immiscible with water and exists as a liquid at 25° C. The oleaginous liquid preferably is non-toxic. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards.

Suitable oleaginous liquids include, but are not necessarily limited to olefins, paraffins, water insoluble polyglycols, water insoluble esters, water insoluble Fischer-Tropsch reaction products, and other non-toxic organic materials, and combinations thereof. Suitable paraffins are described in U.S. Pat. No. 5,837,655, incorporated herein by reference. Suitable polyglycols have a molecular weight sufficiently high to render them water insoluble.

Preferred oleaginous liquids are relatively non-toxic branched and/or linear olefins. Examples of suitable olefins include, but are not necessarily limited to polyalphaolefins, linear alpha olefins, and internal olefins, preferably skeletally isomerized olefins, and mixtures thereof. Preferred olefins are described in U.S. Pat. Nos. 5,605,879 and 5,851,958, incorporated herein by reference. In a preferred embodiment, the oleaginous phase comprises olefins having at least 14 carbon atoms, more preferably at least 15 carbon atoms, and most preferably at least 16 carbon atoms. In a most preferred embodiment, the oleaginous phase is C16, C18 isomerized olefins, which are available from Chevron Phillips Chemical Company.

The amount of oleaginous liquid, preferably olefins, in the invert emulsion fluid varies depending upon the particular oleaginous liquid used, the non-oleaginous liquid used, and the particular application in which the invert emulsion fluid is to be employed. The amount of oleaginous liquid generally is sufficient to form the continuous phase and for the non-oleaginous liquid to form a stable emulsion in the oleaginous liquid. The quantity of oleaginous liquid will increase with the density of a given fluid. Typically, the amount of oleaginous liquid is at least about 50 vol. % of the total invert emulsion fluid.

As used herein, the term "non-oleaginous liquid" means a material which is a liquid at 25° C. and which is not an oleaginous liquid, as defined above. Non-oleaginous liquids are immiscible with the oleaginous liquid, and form an emulsion in the oleaginous liquid which preferably is stabilized by a suitable emulsifier. Suitable non-oleaginous liquids include aqueous substances such as water, seawater, and/or brine comprising inorganic or organic dissolved salts, as well as water-miscible organic compounds. A most preferred non-oleaginous liquid is seawater.

The drilling system fluids are useful in rotary drilling processes for drilling subterranean formations containing oil, gas, or other minerals, and in geothermal drilling, water drilling, and geoscientific drilling. Invert emulsion drilling system fluids provide stability to the drilled hole (typically called the wellbore), form a thin filter cake, lubricate the wellbore, and often penetrate salt beds without undue sloughing or enlargement of the drilled hole. As used herein, the term "invert emulsion drilling system fluid" also encompasses spotting fluids, lubricating additives, and other additives used during drilling operations, and invert emulsions comprising such additives.

Preferred invert emulsion drilling system fluids for use herein are "drilling fluids" and "drill-in" fluids. A "drilling fluid" is used to drill a borehole through the earth to reach the payzone. A "drill-in" fluid is pumped through the drill pipe while drilling through the "payzone," or the zone believed to hold recoverable oil or gas.

In order to prevent bit balling and sloughing off of shale which comes into contact with the dispersed phase, it is necessary to provide shale stabilization. It is possible to provide shale stabilization by using a high concentration of inorganic salt in the dispersed phase. Clay chemistry has shown that cationic base exchange with the negatively charged clay minerals commonly found in shale formations, limits their ability to hydrate, soften, and swell, thereby rendering them more stable in the presence of water based fluids and reducing or preventing screen blinding. Unfortunately, concentrated solutions of inorganic salts are toxic.

The present application provides shale stabilization by providing the non-oleaginous phase with a quantity of at least one organofunctional compound comprising "exchangeable groups," defined as moieties which dissociate from the compound and exchange with water reactive sites present in surrounding clay or shale and reduce or preferably prevent screen blinding. Suitable exchangeable groups are electrophilic groups, most preferably cations. Without limiting the invention to particular theory or mechanism of action, it is believed that the exchangeable groups block water reactive sites in the clay, which prevents those sites from absorbing water, and thereby prevents swelling and/or sloughing of the clay or shale.

The exchangeable groups preferably are derived from primary functional groups. Most preferably, the organofunctional compound comprises at least two primary functional groups. By "primary functional groups" is meant a functional group which is bound to a single alkyl moiety. For example, an alkyl amine is a primary functional group. A dialkyl amine is not a primary functional group.

Examples of primary functional groups comprising suitable exchangeable groups include, but are not necessarily limited to nitrogen containing groups, oxygen containing groups, sulfur containing groups, and phosphorus containing groups. Preferred primary functional groups are selected from the group consisting of amine groups, hydroxyl groups, and salts thereof. More preferred primary functional groups are selected from the group consisting of amine groups and salts thereof, preferably amine groups and protonated amine groups. Even more preferably, the organofunctional compound is selected from the group consisting of a diamine and salts thereof, most preferably an alkylenediamine wherein the alkyl moiety comprises from about 1 to about 7 to carbon atoms, preferably from about 2 to about 7 carbon atoms, and more preferably from about 2 to about 6 carbon atoms, wherein the carbon atoms may be joined to form a cycloalkyl.

Suitable organofunctional compounds for use in the dispersed phase have the following general structure:

wherein X and Y independently are primary functional groups comprising exchangeable groups. Preferably, X and Y independently are selected from the group consisting of nitrogen containing groups, oxygen containing groups, sulfur containing groups, and phosphorus containing groups. More preferably X and Y independently are selected from the group consisting of amine groups, hydroxyl groups, and salts thereof; most preferably both X and Y independently are selected from the group consisting of amine groups and salts thereof;

R is selected from the group consisting of linear alkylene groups having from about 1 to about 7 carbon atoms, preferably from about 2 to about 7 carbon atoms, most preferably from about 2 to about 6 carbon atoms, and cyclic alkylene groups having from about 3 to about 6 carbon atoms, wherein R is either unsubstituted or bears substituents effective to maintain or increase the dissociability of the exchangeable groups. For example, where the exchangeable group is cationic in nature, acceptable substituents either would not affect the charge distribution of the molecule or would be electrophilic or cationic in nature.

In a preferred embodiment, the organofunctional salt is selected from the group consisting of urea, alkanolamines, diaminocycloalkanes, substituted or unsubstituted alkylene diamines; and, combinations thereof. In a more preferred embodiment, the organic material is selected from the group consisting of substituted or unsubstituted trialkanolamines; diaminocycloalkanes; alkylene diamines; and, combinations thereof. In a most preferred embodiment, the organofunctional compounds are selected from the group consisting of substituted or unsubstituted triethanolamines, diaminocyclohexanes, hexamethylenediamines, salts thereof, and combinations thereof. A preferred commercially available mixture is CLAYTROL™, which is commercially available from Baker Hughes INTEQ.

A given organofunctional compound is "effective to provide shale inhibition" when the organofunctional compound produces an invert emulsion fluid that exhibits electrical stability of 350–450 volts and HTHP (high temperature high pressure differential filtration) of 6 or less.

The amount of non-oleaginous liquid in the invert emulsion fluid varies depending upon the particular non-oleaginous liquid used and the particular application in which the invert emulsion fluid is to be employed. The amount of non-oleaginous liquid is effective to produce a stable emulsion and decreases with the density of the fluid. Typically, the amount of non-oleaginous liquid is at least about 1 vol. %, preferably from about 1 vol. % to about 50 vol. % or less of the total invert emulsion fluid.

The invert emulsions generally may comprise other components known in the art. Composition and Properties of Drilling and Completion Fluids, 5th Edition, H. C. H. Darley, George R. Gray, Gulf Publishing Company, 1988, pp. 328–332, incorporated by reference. Conventional additives include, but are not necessarily limited to shale stabilizer(s) other than the organofunctional compound(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides, and combinations thereof. Lime or another alkaline material may be added to an invert emulsion fluid to maintain a reserve alkalinity and to counter acidic gases, which often are encountered during drilling operations.

In a preferred embodiment, the invert emulsion fluid comprises: emulsifier(s), clay(s), preferably quaternized clay(s), rheological modifier(s), preferably acrylate or methacrylate based modifier(s), weighting agent(s), and, wetting agent(s) effective to prevent fluid loss. A preferred type of wetting agent is a polyolefin amide alkene amine wetting agent, most preferably BIO-COTE™, available from Baker Hughes INTEQ.

Substantially any method may be used to prepare the invert emulsion drilling system fluids of the present invention as long as the method is effective to form an invert emulsion. Generally, the components are mixed together in any order under agitation conditions. In a preferred embodiment, an appropriate quantity of non-oleaginous liquid is mixed with an appropriate quantity of the organofunctional compound and, if necessary or desired, an acid to protonate the organofunctional compound. The resulting mixture is subjected to mild agitation. An oleaginous fluid is then added while mixing until an invert emulsion is formed. If a weight material is to be used, then the weight material typically is added after the invert emulsion fluid is formed.

One skilled in the art may readily identify whether the appropriate ingredients and amounts have been used to form the invert emulsion using the following test:

Invert Emulsion Test

A small portion of the emulsion is placed in a beaker which contains an oleaginous fluid. If the emulsion is an invert emulsion, the small portion will disperse in the oleaginous fluid. Visual inspection determines whether the small portion added has dispersed.

Alternately, the electrical stability of the invert emulsion is tested using known procedures. Generally, voltage is applied across two electrodes immersed in the emulsion, and the voltage is increased until the emulsion breaks and a surge of current flows between the two electrodes. The voltage required to break the emulsion is a common measure of the stability of an emulsion. Other tests are described on page 166 of the book, Composition and Properties of Drilling and Completion Fluids, 5th Edition, H. C. H. Darley and George Gray, Gulf Publishing Company, 1988, the contents of which are hereby incorporated by reference.

In the following Examples, the following commercial products available from Baker Hughes INTEQ were used: CARBOGEL, a quaternized clay; OMNI-MUL, a polyamide emulsifier; CLAYTROL, a water soluble shale hydration and dispersion inhibitor for water based drilling fluids; DFE-434, a quaternized clay; MIL-BAR™ a barite additive; MIL-GEL™, a ground montmorillonite used to simulate formation shale contaminant. The following commercial products, available from sources other than Baker Hughes INTEQ were used: CF-2002, an ester/olefin blend available from Chevron Phillips Chemical Co.; C16, C18 isomerized olefins obtained from Chevron Phillips Chemical Co.; LUBRIZOL (R) 3702 and LUBRIZOL (R) 7720C, rheological modifiers available from the Lubrizol Corporation; REV-DUST™, a simulated drilled product which may be obtained from Mil-White Company, Houston, Tex.; RHODIA CS-50, a formate salt of 1,6-diamine hexane, and RHODIA CS-60, a chloride salt of 1,6,-diamine hexane. The following organofunctional compounds are available from a variety of commercial sources: aminoethylpiperazine; diaminocyclohexane; hexamethylenetriamine; urea; triethanolamine; aminoethylethanolamine; hexamethylenediamine; 2-amino-2-methyl-1-propanol; and, tetraethylenepentamine.

The invention will be better understood with reference to the examples which are illustrative only:

EXAMPLE I

In order to determine the desired composition of a suitable base fluid, a variety of invert emulsion fluids were made using CF-2002 as the continuous phase and MIL-GEL NT as the contaminant. The invert emulsion fluids were subjected to standard testing to determine rheological and fluid loss properties. The compositions tested and the results are given in the following Table:

| | OP-499: 12.0 lb/gal CF-2002, using Seawater as Brine Phase | | | | | | | | | | | |
|---|---|---|---|---|---|---|---|---|---|---|---|---|
| | Sample No. | | | | | | | | | | | |
| | 1 | 1-S | 2 | 2-S | 3 | 3-S | 4 | 4-S | 5 | 5-S | 6 | 6-S |
| CF-2002, bbl | 0.575 | 0.575 | 0.575 | 0.575 | 0.575 | 0.575 | 0.575 | 0.575 | 0.575 | 0.575 | 0.575 | 0.575 |
| CARBOGEL, lb | 2 | 2 | 2 | 2 | | | | | | | | |
| OMNI-MUL, lb | 14 | 14 | 14 | 14 | 14 | 14 | 14 | 14 | 14 | 14 | 14 | 14 |
| Seawater, bbl | 0.2 | 0.2 | 0.171 | 0.171 | 0.2 | 0.2 | 0.171 | 0.171 | 0.171 | 0.171 | 0.171 | 0.171 |
| CLAY-TROL, lb | | | 10 | 10 | | | 10 | 10 | 10 | 10 | 10 | 10 |
| Lubrizol (R) 3702, lb | | | | | | | | | 3 | 3 | | |
| Lubrizol (R) 7720C, lb | | | | | | | | | | | 3 | 3 |
| CARBO-TEC S, lb | 1 | 1 | 1 | 1 | 1 | 1 | 1 | 1 | 1 | 1 | 1 | 1 |
| MILBAR, lb | 255 | 255 | 255 | 255 | 255 | 255 | 255 | 255 | 255 | 255 | 255 | 255 |
| MIL-GEL NT, lb | | 54* | | 54* | | 27 | | 27 | | 27 | | 27 |
| O/W Ratio | 80/20 | 80/20 | 80/20 | 80/20 | 80/20 | 80/20 | 80/20 | 80/20 | 80/20 | 80/20 | 80/20 | 80/20 |
| Density, lb/gal | 12 | 12 | 12 | 12 | 12 | 12 | 12 | 12 | 12 | 12 | 12 | 12 |
| Samples hot-rolled 16 hours @ 150° F. Stirred 5 minutes. | | | | | | | | | | | | |
| Plastic Viscosity, Cp @ 120° F. | 17 | 33 | 20 | 41 | 18 | 34 | 18 | 30 | 19 | 28 | 20 | 30 |
| Yield Point, lb/100 sq ft | 13 | 18 | 17 | 28 | 6 | 22 | 8 | 7 | 12 | 19 | 11 | 13 |
| 10-sec Gel, lb/100 sq ft | 5 | 8 | 8 | 14 | 3 | 10 | 4 | 6 | 5 | 8 | 5 | 7 |
| 10-min Gel, lb/100 sq ft | 6 | 10 | 9 | 16 | 3 | 14 | 4 | 8 | 6 | 9 | 5 | 9 |
| Electrical stability, volts | 400 | 260 | 700 | 480 | 170 | 305 | 270 | 400 | 350 | 365 | 330 | 340 |
| HTHP, 30 min @ 250° F., ml | | 11 | | 16 | | 18 | | 16 | | 20 | | 20 |
| Water in filtrate, ml | | 0.5 | | 0.5 | | 0.5 | | 1 | | 1 | | 1 |

*Rev-Dust used

As seen from the foregoing, fluid loss was observed in the samples to which contaminant was added.

EXAMPLE II

Again, variety of invert emulsion fluids were made using either CF-2002 or C-16,18 olefin as the continuous phase and using the compositions given in the following Table. The fluids were subjected to standard testing to determine rheological and fluid loss properties. The results are given in the following Table:

OP-499: 12.0 lb/gal CF-2002 or C-16, 18, using Seawater as Brine Phase

| | Sample No. | | | | | | | | | | | |
|---|---|---|---|---|---|---|---|---|---|---|---|---|
| | 7 | 7-S | 8 | 8-S | 9 | 9-S | 10 | 10-S | 11 | 11-S | 12 | 12-S |
| CF-2002, bbl | 0.575 | 0.575 | 0.575 | 0.575 | 0.575 | 0.575 | | | | | | |
| C-16, 18, bbl | | | | | | | 0.575 | 0.575 | 0.575 | 0.575 | 0.575 | 0.575 |
| OMNI-MUL, lb | 14 | 14 | 14 | 14 | 20 | 20 | 20 | 20 | | | | |
| OMNI-MUL E, lb | | | | | | | | | 20 | 20 | 20 | 20 |
| Seawater, bbl | 0.171 | 0.171 | 0.171 | 0.171 | 0.171 | 0.171 | 0.171 | 0.171 | 0.171 | 0.171 | 0.171 | 0.171 |
| CARBOGEL, lb | 1 | 1 | | | 1 | 1 | 1 | 1 | 1 | 1 | 1 | 1 |
| SD-1, lb | | | 1 | 1 | | | | | | | | |
| CLAY-TROL, lb | 10 | 10 | 10 | 10 | 10 | 10 | 10 | 10 | 10 | 10 | | |
| Rhodia CS-60, lb | | | | | | | | | | | 10 | 10 |
| Lubrizol (R) 7720C, lb | 3 | 3 | 3 | 3 | 3 | 3 | 3 | 3 | 3 | 3 | 3 | 3 |
| CARBO-TEC S, lb | 1 | 1 | 1 | 1 | 1 | 1 | 1 | 1 | 1 | 1 | 1 | 1 |
| MILBAR, lb | 255 | 255 | 255 | 255 | 255 | 255 | 255 | 255 | 255 | 255 | 255 | 255 |
| MIL-GEL NT, lb | | 27 | | 27 | | 27 | | 27 | | 27 | | 27 |
| O/W Ratio | 80/20 | 80/20 | 80/20 | 80/20 | 80/20 | 80/20 | 80/20 | 80/20 | 80/20 | 80/20 | 80/20 | 80/20 |
| Density, lb/gal | 12 | 12 | 12 | 12 | 12 | 12 | 12 | 12 | 12 | 12 | 12 | 12 |
| Samples hot-rolled 16 hours @ 150° F. Stirred 5 minutes. | | | | | | | | | | | | |
| Plastic Viscosity, Cp @ 120° F. | 19 | 31 | 19 | 29 | 20 | 35 | 17 | 30 | 18 | 30 | 18 | 23 |
| Yield Point, lb/100 sq ft | 8 | 21 | 5 | 9 | 5 | 18 | 10 | 17 | 9 | 20 | 5 | 9 |
| 10-sec Gel, lb/100 sq ft | 5 | 10 | 4 | 7 | 4 | 9 | 5 | 12 | 4 | 11 | 4 | 6 |
| 10-min Gel, lb/100 sq ft | 6 | 13 | 5 | 9 | 5 | 12 | 6 | 14 | 5 | 13 | 5 | 8 |
| Electrical stability, volts | 300 | 475 | 300 | 425 | 400 | 550 | 550 | 680 | 210 | 550 | 230 | 510 |
| HTHP, 30 min @ 250° F. | | 10 | | 18 | | 6 | | 8 | | 14 | | 22 |
| Water in filtrate, ml | | 0.5 | | 1 | | 0.5 | | 0.5 | | 1 | | 1 |

Again, fluid loss was observed in the samples to which contaminant was added.

EXAMPLE III

C-16, 18 invert emulsions were tested with and without contaminant and with and without BIOCOTE, a polyamide wetting agent, available from Baker Hughes INTEQ, in order to determine whether the wetting agent would successfully prevent fluid loss. The following were the results:

| | Sample No. | | | | | | | | | | | |
|---|---|---|---|---|---|---|---|---|---|---|---|---|
| | 13 | 13-S | 14 | 14-S | 14-ST | 15-S | 16-S | 17 | 17-S | 18 | 18-S | 19 | 19-S |
| | OP-499: 12.0 lb/gal CF-2002 or C-16, 18, using Seawater as Brine Phase | | | | | | | | | | | | |
| CF-2002, bbl | | | | | | | | | | | | | |
| C-16, 18, bbl | 0.575 | 0.575 | 0.575 | 0.575 | 0.575 | 0.575 | 0.575 | 0.575 | 0.575 | 0.575 | 0.575 | 0.575 |

-continued

| | | | | | | | | | | | | | |
|---|---|---|---|---|---|---|---|---|---|---|---|---|---|
| OMNI-MUL, lb | 10 | 10 | 20 | 20 | 20 | 14 | 14 | 14 | 14 | 14 | 14 | 14 | 14 |
| OMNI-TEC, lb | 4 | 4 | | | | | | | | | | | |
| Lime, lb | 3 | 3 | | | | | | | | | | | |
| Seawater, bbl | 0.171 | 0.171 | 0.171 | 0.171 | 0.171 | 0.171 | 0.171 | 0.2 | 0.2 | 0.2 | 0.2 | 0.186 | 0.186 |
| CARBOGEL, lb | 1 | 1 | | | | | | | | | | | |
| DFE-434, lb | | | 1 | 1 | 1 | 1 | 1 | 1 | 1 | 1 | 1 | 1 | 1 |
| CLAY-TROL, lb | 10 | 10 | 10 | 10 | 10 | 10 | 10 | | | | | 5 | 5 |
| Lubrizol (R) 7720C, lb | 3 | 3 | 3 | 3 | 3 | 3 | 3 | 3 | 3 | 3 | 3 | 3 | 3 |
| CARBO-TEC S, lb | 1 | 1 | 1 | 1 | 1 | 1 | 1 | 1 | 1 | 1 | 1 | 1 | 1 |
| MILBAR, lb | 255 | 255 | 255 | 255 | 255 | 255 | 255 | 255 | 255 | 255 | 255 | 255 | 255 |
| MIL-GEL NT, lb | | 27 | | 27 | | 27 | 27 | | | 27 | | 27 | 27 |
| BIO-COTE | | | | | 2 | 1 | 2 | 2 | 2 | 2 | | 2 | 2 |
| O/W Ratio | 80/20 | 80/20 | 80/20 | 80/20 | 80/20 | 80/20 | 80/20 | 80/20 | 80/20 | 80/20 | 80/20 | 80/20 | 80/20 |
| Density, lb/gal | 12 | 12 | 12 | 12 | 12 | 12 | 12 | 12 | 12 | 12 | 12 | 12 | 12 |

Samples hot-rolled 16 hours @ 150° F. Stirred 5 minutes.

| | | | | | | | | | | | | | |
|---|---|---|---|---|---|---|---|---|---|---|---|---|---|
| Plastic Viscosity, Cp @ 120° F. | 19 | 21 | 18 | 26 | 27 | 22 | 24 | 18 | 29 | 17 | 29 | 20 | 28 |
| Yield Point, lb/100 sq ft | 1 | 5 | 18 | 31 | 18 | 16 | 14 | 10 | 26 | 19 | 27 | 10 | 17 |
| 10-sec Gel, lb/100 sq ft | 2 | 5 | 7 | 15 | 6 | 6 | 5 | 4 | 7 | 7 | 12 | 5 | 7 |
| 10-min Gel, lb/100 sq ft | 3 | 9 | 8 | 16 | 7 | 7 | 7 | 5 | 9 | 8 | 16 | 5 | 8 |
| Electrical stability, volts | 280 | 340 | 400 | 650 | 550 | 380 | 400 | 230 | 340 | 300 | 410 | 280 | 420 |
| HTHP, 30 min @ 250° F. | | >50 | | 7 | 4 | 15 | 4 | | 7 | | 5 | | 4 |
| Water in filtrate, ml | | 2 | | 0.5 | | | | | | | 1 | | |

| | Sample No. | |
|---|---|---|
| | 20 | 20-S |

OP-499: 12.0 lb/gal CF-2002 or C-16, 18, using Seawater as Brine Phase

| | | |
|---|---|---|
| CF-2002, bbl | | |
| C-16, 18, bbl | 0.575 | 0.575 |
| OMNI-MUL, lb | 14 | 14 |
| OMNI-TEC, lb | | |
| Lime, lb | | |
| Seawater, bbl | 0.186 | 0.186 |
| CARBOGEL, lb | | |
| DFE-434, lb | 1 | 1 |
| CLAY-TROL, lb | 5 | 5 |
| Lubrizol (R) 7720C, lb | | |
| CARBO-TEC S, lb | 1 | 1 |
| MILBAR, lb | 255 | 255 |
| MIL-GEL NT, lb | | 27 |
| BIO-COTE | 2 | 2 |
| O/W Ratio | 80/20 | 80/20 |
| Density, lb/gal | 12 | 12 |

-continued

| Samples hot-rolled 16 hours @ 150° F. Stirred 5 minutes. | | |
|---|---|---|
| Plastic Viscosity, Cp @ 120° F. | 18 | 26 |
| Yield Point, lb/100 sq ft | 10 | 13 |
| 10-sec Gel, lb/100 sq ft | 4 | 6 |
| 10-min Gel, lb/100 sq ft | 4 | 7 |
| Electrical stability, volts | 400 | 430 |
| HTHP, 30 min @ 250° F. Water in filtrate, ml | | 11 |

The use of the wetting agent BIO-COTE™ prevented the contaminated samples from exhibiting fluid loss.

EXAMPLE IV

Having determined a preferred base fluid, a variety of organofunctional amines were added to the base fluid and the shale inhibition and rheological properties were compared. A fluid using calcium chloride as the non-oleaginous phase was also tested for comparison. All of the organoamines were in the form of acetate salts, except for CS-6 (formate salt) and CS-60 (chloride salt). The following parameters (after hot rolling) were used to select candidates with effective rheology and fluid loss control properties:

| | |
|---|---|
| Plastic Viscosity (PV), Cp @ 120 F. | 26–30 |
| Yield Point (YP), lb/100 sq ft | 12–18 |
| 10-sec Gel, lb/100 sq ft | 4–8 |
| 10-min Gel, lb/100 sq ft | 5–10 |
| Electrical stability, volts | 350–450 |
| HTHP, 30 min @ 250 F. | 6 or less |
| Water in filtrate, ml | none |

Organofunctional compounds that exhibited electrical stability of 350–450 volts and HTHP (high temperature high pressure differential filtration) of 6 or less are defined as "effective to provide shale inhibition" in the invert emulsion fluid.

The results are given in FIG. 1. The candidate containing tetraethylenepentamine was the only candidate containing BIOCOTE which exhibited fluid loss with detrimental water phase. Based on the results in FIG. I, the following candidates were identified as exhibiting effective rheology and fluid loss control properties:
CLAYTROL
Diaminocyclohexane
Triethanolamine
Hexamethylenediamine Although the plastic viscosity and yield point were not ideal, urea also was identified as a preferred candidate because of its wide availability and relative lack of toxicity.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. An invert emulsion drilling system fluid with effective rheology and fluid loss control properties, said drilling system fluid comprising an oleaginous continuous phase and a non-oleaginous dispersed phase, said dispersed phase comprising an amount of organofunctional compound effective to provide shale inhibition, said organofunctional compound comprising an active ingredient selected from the group consisting of triethanolamine, alkylenediamine, alkylenediamine salts, and combinations thereof, said invert emulsion drilling fluid further comprising a quantity of a polyolefin amide alkene amine.

2. The invert emulsion drilling system fluid of claim 1 wherein said organofunctional compound comprises an alkylene group having from about 1 to about 7 carbon atoms, wherein the carbon atoms comprise an entity selected from the group consisting of a linear entity, a branched entity, and a cycloalkyl entity.

3. The invert emulsion drilling system fluid of claim 1 selected from the group consisting of a drilling fluid and a drill-in fluid.

4. The invert emulsion drilling system fluid of claim 2 selected from the group consisting of a drilling fluid and a drill-in fluid.

5. The invert emulsion drilling system fluid of claim 4 wherein said oleaginous continuous phase comprises olefins selected from the group consisting of isomerized olefins, linear alpha olefins, and combinations thereof, a majority of said olefins having 16 carbon atoms or more.

6. The invert emulsion drilling system fluid of claim 5 wherein a majority of said olefins have from about 16 to about 18 carbon atoms.

7. An invert emulsion drilling system fluid with effective rheology and fluid loss control properties, said drilling system fluid comprising an oleaginous continuous phase and a non-oleaginous dispersed phase, said dispersed phase comprising an amount of organofunctional compound effective to provide shale inhibition, said organofunctional compound comprising an active ingredient selected from the group consisting of diaminocyclohexane, salts of diaminocyclohexane, and combinations thereof.

8. The invert emulsion drilling system fluid of claim 7 selected from the group consisting of a drilling fluid and a drill-in fluid.

9. The invert emulsion drilling system fluid of claim 7 wherein said oleaginous continuous phase comprises olefins selected from the group consisting of isomerized olefins, linear alpha olefins, and combinations thereof, a majority of said olefins having 16 carbon atoms or more.

10. The invert emulsion drilling system fluid of claim 9 wherein a majority of said olefins have from about 16 to about 18 carbon atoms.

11. The invert emulsion drilling system fluid of claim 8 wherein said oleaginous continuous phase comprises olefins selected from the group consisting of isomerized olefins, linear alpha olefins, and combinations thereof, a majority of said olefins having 16 carbon atoms or more.

12. The invert emulsion drilling system fluid of claim 10 wherein a majority of said olefins have from about 16 to about 18 carbon atoms.

13. The invert emulsion drilling system fluid of claim 7 further comprising comprising a quantity of a polyolefin amide alkene amine.

14. An invert emulsion drilling system fluid with effective rheology and fluid loss control properties, said drilling system fluid comprising an oleaginous continuous phase and a non-oleaginous dispersed phase, said dispersed phase comprising an amount of hexamethylenediamine effective to provide shale inhibition, wherein said oleaginous continuous phase comprises olefins selected from the group consisting of isomerized olefins, linear alpha olefins, and combinations thereof, a majority of said olefins having 16 carbon atoms or more.

15. The invert emulsion drilling system fluid of claim 14 wherein a majority of said olefins have from about 16 to about 18 carbon atoms.

16. An invert emulsion drilling system fluid with effective rheology and fluid loss control properties, said drilling system fluid comprising an oleaginous continuous phase and a non-oleaginous dispersed phase, said dispersed phase comprising an amount of hexamethylenediamine effective to provide shale inhibition and, said invert emulsion drilling system fluid further comprising a quantity of a polyolefin amide alkene amine.

17. The invert emulsion drilling system fluid of claim 16 wherein said oleaginous continuous phase comprises olefins selected from the group consisting of isomerized olefins, linear alpha olefins, and combinations thereof, a majority of said olefins having 16 carbon atoms or more.

18. The invert emulsion drilling system fluid of claim 17 wherein a majority of said olefins have from about 16 to about 18 carbon atoms.

19. An invert emulsion drilling system fluid with effective rheology and fluid loss control properties, said drilling system fluid comprising an oleaginous continuous phase and a non-oleaginous dispersed phase, said oleaginous continuous phase comprising olefins selected from the group consisting of isomerized olefins, linear alpha olefins, and combinations thereof, a majority of said olefins having 16 carbon atoms or more, said dispersed phase comprising an amount of organofunctional compound effective to provide shale inhibition, said organofunctional compound comprising an active ingredient selected from the group consisting of urea, salts of urea, and combinations thereof.

20. The invert emulsion drilling system fluid of claim 19 selected from the group consisting of a drilling fluid and a drill-in fluid.

21. The invert emulsion drilling system fluid of claim 19 wherein a majority of said olefins have from about 16 to about 18 carbon atoms.

22. The invert emulsion drilling system fluid of claim 20 wherein a majority of said olefins have from about 16 to about 18 carbon atoms.

23. The invert emulsion drilling system fluid of claim 19 further comprising a quantity of a polyolefins amide alkene amine.

24. An invert emulsion drilling system fluid with effective rheology and fluid loss control properties, said drilling system fluid comprising an oleaginous continuous phase and a non-oleaginous dispersed phase, said dispersed phase comprising an amount of organofunctional compound comprising a quantity and type of exchangeable groups effective to provide shale inhibition, said invert emulsion drilling fluid further comprising a quantity of polyolefins amide alkene amine.

25. The invert emulsion drilling system fluid of claim 24 wherein said organofunctional compound comprises a quantity of primary functional groups effective to provide said quantity and type of exchangeable groups.

26. The invert emulsion drilling system fluid of claim 24 wherein said exchangeable groups are cations.

27. The invert emulsion drilling system fluid of claim 25 wherein said exchangeable groups are cations.

28. The invert emulsion drilling system fluid of claim 24 wherein said primary functional groups are selected from the group consisting of nitrogen containing groups, oxygen containing groups, sulfur containing groups, and phosphorus containing groups.

29. The invert emulsion drilling system fluid of claim 25 wherein said primary functional groups are selected from the group consisting of nitrogen containing groups, oxygen containing groups, sulfur containing groups, and phosphorus containing groups.

30. The invert emulsion drilling system fluid of claim 24 wherein said primary functional groups are selected from the group consisting of amine groups, hydroxyl groups, and salts thereof.

31. The invert emulsion drilling system fluid of claim 25 wherein said primary functional groups are selected from the group consisting of amine groups and salts thereof.

32. An invert emulsion drilling system fluid with effective rheology and fluid loss control properties, said drilling system fluid comprising an oleaginous continuous phase and a non-oleaginous dispersed phase, said dispersed phase comprising an amount of at least one organofunctional compound comprising at least two primary functional groups comprising a quantity and type of exchangeable groups effective to provide shale inhibition, said invert emulsion drilling system fluid further comprising a quantity of polyolefins amide alkene amine.

33. The invert emulsion drilling system fluid of claim 32 wherein said exchangeable groups are cations.

34. The invert emulsion drilling system fluid of claim 32 wherein said primary functional groups are selected from the group consisting of nitrogen containing groups, oxygen containing groups, sulfur containing groups, and phosphorus containing groups.

35. The invert emulsion drilling system fluid of claim 33 wherein said primary functional groups are selected from the group consisting of nitrogen containing groups, oxygen containing groups, sulfur containing groups, and phosphorus containing groups.

36. The invert emulsion drilling system fluid of claim 32 wherein said primary functional groups are selected from the group consisting of amine groups, hydroxyl groups, and salts thereof.

37. The invert emulsion drilling system fluid of claim 33 wherein said primary functional groups are selected from the group consisting of amine groups and salts thereof.

38. The invert emulsion drilling system fluid of claim 32 selected from the group consisting of a drilling fluid and a drill-in fluid.

39. The invert emulsion drilling system fluid of claim 33 selected from the group consisting of a drilling fluid and a drill-in fluid.

40. The invert emulsion drilling system fluid of claim 34 selected from the group consisting of a drilling fluid and a drill-in fluid.

41. The invert emulsion drilling system fluid of claim 35 selected from the group consisting of a drilling fluid and a drill-in fluid.

42. The invert emulsion drilling system fluid of claim 36 selected from the group consisting of a drilling fluid and a drill-in fluid.

43. The invert emulsion drilling system fluid of claim 37 selected from the group consisting of a drilling fluid and a drill-in fluid.

44. The invert emulsion drilling system fluid of claim 37 wherein said oleaginous continuous phase comprises olefins selected from the group consisting of isomerized olefins, linear alpha olefins, and combinations thereof, a majority of said olefins having 16 carbon atoms or more.

45. The invert emulsion drilling system fluid of claim 44 wherein a majority of said olefins have from about 16 to about 18 carbon atoms.

46. A method for reducing the concentration of inorganic salts required to provide shale inhibition during drilling operations using invert emulsion drilling system fluids comprising an oleaginous continuous phase and a non-oleaginous dispersed phase, said method comprising
providing said non-oleaginous dispersed phase of said fluid with an amount of organofunctional compound effective to provide shale inhibition; and,
providing said invert emulsion drilling system fluid with a quantity of polyolefins amide alkene amine.

47. The method of claim 46 further comprising providing said organofunctional compound comprising exchangeable groups derived from primary functional groups selected from the group consisting of nitrogen containing groups, oxygen containing groups, sulfur containing groups, and phosphorus containing groups.

48. The method of claim 46 further comprising providing said organofunctional compound comprising exchangeable groups derived from primary functional groups selected from the group consisting of amine groups, hydroxyl groups, and salts thereof.

49. The method of claim 46 further comprising providing said organofunctional compound comprising at least two primary functional groups comprising exchangeable groups.

50. The method of claim 46 wherein said organofunctional compound has the following general structure:

X—R—Y wherein
X and Y independently are primary functional groups comprising exchangeable groups effective to provide shale inhibition;
R is selected from the group consisting of linear alkylene groups having from about 1 to about 7 carbon atoms and cyclic alkylene groups having from about 3 to about 6 carbon atoms, wherein R is either unsubstituted or comprises one or more substituent effective to maintain said exchangeable groups in dissociable form.

51. The method of claim 47 further comprising providing cations as said exchangeable groups.

52. The method of claim 48 further comprising providing cations as said exchangeable groups.

53. The method of claim 49 further comprising providing cations as said exchangeable groups.

54. A method for reducing the concentration of inorganic salts required to provide shale inhibition during drilling operations using invert emulsion drilling system fluids, said method comprising:
providing said invert emulsion drilling system fluid selected from the group consisting of a drilling fluid and a drill-in fluid, said invert emulsion drilling system fluid comprising an oleaginous continuous phase and a non-oleaginous dispersed phase; and,
providing said non-oleaginous dispersed phase with an amount of organofunctional compound comprising an active ingredient selected from the group consisting of diaminocyclohexane, salts of diaminocyclohexane, and combinations thereof; and
performing drilling operations using said invert emulsion drilling system fluid, said organofunctional compound providing effective shale inhibition.

55. The method of claim 54 further comprising providing said effective shale inhibition using a reduced concentration of metallic salt(s) compared to the amount of metallic salt(s) required to provide the same effective shale inhibition using said invert emulsion drilling system fluid in the absence of said organofunctional compound.

56. The method of claim 54 further comprising providing said effective shale inhibition without adding inorganic salt to said invert emulsion drilling system fluid.

57. A method for reducing the concentration of inorganic salts required to provide shale inhibition during drilling operations using invert emulsion drilling system fluids, the method comprising:
providing said invert emulsion drilling system fluid selected from the group consisting of a drilling fluid and a drill-in fluid, said invert emulsion drilling system fluid comprising an oleaginous continuous phase and a non-oleaginous dispersed phase and,
providing said non-oleaginous dispersed phase with an amount of hexamethylene diamine effective to provide shale inhibition; and
performing drilling operations using said invert emulsion drilling system fluid, said hexamethylene diamine providing effective shale inhibition.

58. The method of claim 57 further comprising providing said effective shale inhibition using a reduced concentration of metallic salt(s) compared to the amount of metallic salt(s) required to provide the same effective shale inhibition using said invert emulsion drilling system fluid in the absence of said hexamethylene diamine.

59. The method of claim 57 further comprising providing said effective shale inhibition without adding inorganic salt to said invert emulsion drilling system fluid.

60. A method for reducing the concentration of inorganic salts required to provide shale inhibition during drilling operations using invert emulsion drilling system fluids, the method comprising:
providing said invert emulsion drilling system fluid comprising an oleaginous continuous phase and a non-oleaginous dispersed phase;

providing said non-oleaginous dispersed phase with an amount of organofunctional compound effective to provide shale inhibition, said organofunctional compound comprising exchangeable cations derived from primary functional groups selected from the group consisting of nitrogen containing groups, oxygen containing groups, sulfur containing groups, and phosphorus containing groups; and, performing drilling operations selected from the group consisting of rotary drilling operations and drill-in operations using said invert emulsion drilling system fluid, said effective shale inhibition being provided using a reduced concentration of metallic salt(s) compared to the amount of metallic salt(s) required to provide the same effective shale inhibition using said invert emulsion drilling system fluid in the absence of said organofunctional compound.

61. The method of claim 60 further comprising providing said organofunctional compound comprising exchangeable cations derived from primary functional groups selected from the group consisting of amine groups, hydroxyl groups, and salts thereof.

62. The method of claim 60 further comprising providing said organofunctional compound comprising at least two primary functional groups comprising exchangeable cations.

63. The method of claim 60 wherein said organofunctional compound has the following general structure:

$$X—R—Y$$

wherein

X and Y independently are primary functional groups comprising exchangeable cations effective to provide shale inhibition;

R is selected from the group consisting of linear alkylene groups having from about 1 to about 7 carbon atoms and cyclic alkylene groups having from about 3 to about 6 carbon atoms, wherein R is either unsubstituted or comprises one or more substituent effective to maintain said exchangeable cations in dissociable form.

64. A method for reducing the concentration of inorganic salts required to provide shale inhibition during drilling operations using invert emulsion drilling system fluids, the method comprising:

providing said invert emulsion drilling system fluid comprising an oleaginous continuous phase and a non-oleaginous dispersed phase;

providing said non-oleaginous dispersed phase with an amount of organofunctional compound comprising exchangeable cations effective to provide shale inhibition; and;

performing drilling operations using said invert emulsion drilling system fluid without adding inorganic salt to said invert emulsion drilling system fluid.

65. The method of claim 64 wherein said performing drilling operations comprises performing operations selected from the group consisting of drilling and drill-in operations.

66. The method of claim 65 further comprising providing said organofunctional compound comprising exchangeable cations derived from primary functional groups selected from the group consisting of nitrogen containing groups, oxygen containing groups, sulfur containing groups, and phosphorus containing groups.

67. The method of claim 65 further comprising providing said organofunctional compound comprising exchangeable cations derived from primary functional groups selected from the group consisting of amine groups, hydroxyl groups, and salts thereof.

68. The method of claim 65 further comprising providing said organofunctional compound comprising at least two primary functional groups comprising exchangeable cations.

69. The method of claim 65 wherein said organofunctional compound has the following general structure:

$$X—R—Y$$

wherein

X and Y independently are primary functional groups comprising exchangeable cations effective to provide shale inhibition;

R is selected from the group consisting of linear alkylene groups having from about 1 to about 7 carbon atoms and cyclic alkylene groups having from about 3 to about 6 carbon atoms, wherein R is either unsubstituted or comprises one or more substituent effective to maintain said exchangeable cations in dissociable form.

70. A method for reducing the concentration of inorganic salts required to provide shale inhibition during drilling operations using invert emulsion drilling system fluids, said method comprising:

providing said invert emulsion drilling system fluid comprising an oleaginous continuous phase and a non-oleaginous dispersed phase;

providing said non-oleaginous dispersed phase with an amount of organofunctional compound effective to provide shale inhibition;

providing said invert emulsion drilling system fluid with a quantity of a polyolefin amide alkene amine; and, performing drilling operations using said invert emulsion drilling system fluid.

71. The method of claim 70 comprising performing said drilling operations selected from the group consisting of drilling and drill-in operations.

72. The method of claim 71 wherein said effective shale inhibition is provided using a reduced concentration of metallic salt(s) compared to the amount of metallic salt(s) required to provide the same effective shale inhibition using said invert emulsion drilling system fluid in the absence of said organofunctional compound.

73. The method of claim 72 wherein said effective shale inhibition is provided without adding inorganic salt to said invert emulsion drilling system fluid.

74. The method of claim 72 further comprising providing said organofunctional compound comprising exchangeable groups derived from primary functional groups selected from the group consisting of nitrogen containing groups, oxygen containing groups, sulfur containing groups, and phosphorus containing groups.

75. The method of claim 72 further comprising providing said organofunctional compound comprising exchangeable groups derived from primary functional groups selected from the group consisting of amine groups, hydroxyl groups, and salts thereof.

76. The method of claim 72 further comprising providing said organofunctional compound comprising at least two primary functional groups comprising exchangeable groups.

77. The method of claim 72 wherein said organofunctional compound has the following general structure:

$$X—R—Y$$

wherein
X and Y independently are primary functional groups comprising exchangeable groups effective to provide shale inhibition;
R is selected from the group consisting of linear alkylene groups having from about 1 to about 7 carbon atoms and cyclic alkylene groups having from about 3 to about 6 carbon atoms, wherein R is either unsubstituted or comprises one or more substituent effective to maintain said exchangeable groups in dissociable form.

78. The method of claim 70 further comprising providing cations as said exchangeable groups.

79. The method of claim 71 further comprising providing cations as said exchangeable groups.

* * * * *

UNITED STATES PATENT AND TRADEMARK OFFICE
CERTIFICATE OF CORRECTION

PATENT NO. : 7,067,460 B2 Page 1 of 1
APPLICATION NO. : 10/294533
DATED : June 27, 2006
INVENTOR(S) : Jerry L. Summerhill et al.

It is certified that error appears in the above-identified patent and that said Letters Patent is hereby corrected as shown below:

Column 16, line 45, in Claim 57, please insert -- ; -- after the word "phase".

Signed and Sealed this

Twenty-first Day of November, 2006

JON W. DUDAS
*Director of the United States Patent and Trademark Office*